(12) United States Patent
Clausner

(10) Patent No.: US 7,979,452 B2
(45) Date of Patent: Jul. 12, 2011

(54) SYSTEM AND METHOD FOR RETRIEVING TASK INFORMATION USING TASK-BASED SEMANTIC INDEXES

(75) Inventor: Timothy C. Clausner, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 278 days.

(21) Appl. No.: 11/404,724

(22) Filed: Apr. 14, 2006

(65) Prior Publication Data

US 2007/0244879 A1 Oct. 18, 2007

(51) Int. Cl.
*G06F 7/00* (2006.01)
(52) U.S. Cl. .................................................. 707/758
(58) Field of Classification Search .................. None
See application file for complete search history.

(56) References Cited

U.S. PATENT DOCUMENTS

| | | | |
|---|---|---|---|
| 7,181,438 B1 * | 2/2007 | Szabo | 707/2 |
| 7,496,568 B2 * | 2/2009 | Broder et al. | 707/3 |
| 2002/0055868 A1 * | 5/2002 | Dusevic et al. | 705/9 |
| 2005/0262058 A1 * | 11/2005 | Chandrasekar et al. | 707/3 |
| 2007/0185831 A1 * | 8/2007 | Churcher | 707/3 |

OTHER PUBLICATIONS

Sprint User's Guide (SPH-a660), Jun. 1, 2003, Sprint, pp. 1-190.*
Sprint User's Guide ([SPH-a660], Jun. 1, 2003, Sprint, pp. 1-190).*

\* cited by examiner

*Primary Examiner* — Pierre M Vital
*Assistant Examiner* — Truong V Vo
(74) *Attorney, Agent, or Firm* — Tope-McKay & Assoc.

(57) ABSTRACT

Described is a method for retrieving task information using task-based indexes. The method includes an act of acquiring task-based categories and documents. Task-descriptive symbols are then associated with each task-based category. The documents are indexed to create an index having index words and pointers. The index words reflect the information in the documents and the pointers connect particular index words to particular documents or subparts of documents. The task-descriptive symbols are correlated with the index words to create an alignment of words having similar meaning such that index words are matched with similar task-descriptive symbols. The task-based indexes are formed by grouping the alignment of words with the respective task-based category. A user may use the task-based index by inputting task descriptive symbols into the task-based index to retrieve a document having task information pertaining to the task-descriptive symbols.

30 Claims, 4 Drawing Sheets

| Task-Based Categories | Task-Descriptive Symbols |
|---|---|
| Engine Electrical System (Chapter 5) | "check ignition switch" |
| Emissions and Engine Control System (Chapter 6) | "check clutch switch," "replace clutch switch," "replace start switch" |
| Chasis Electrical System (Chapter 12) | "check dimmer switch," "replace dimmer switch" |

FIG. 3

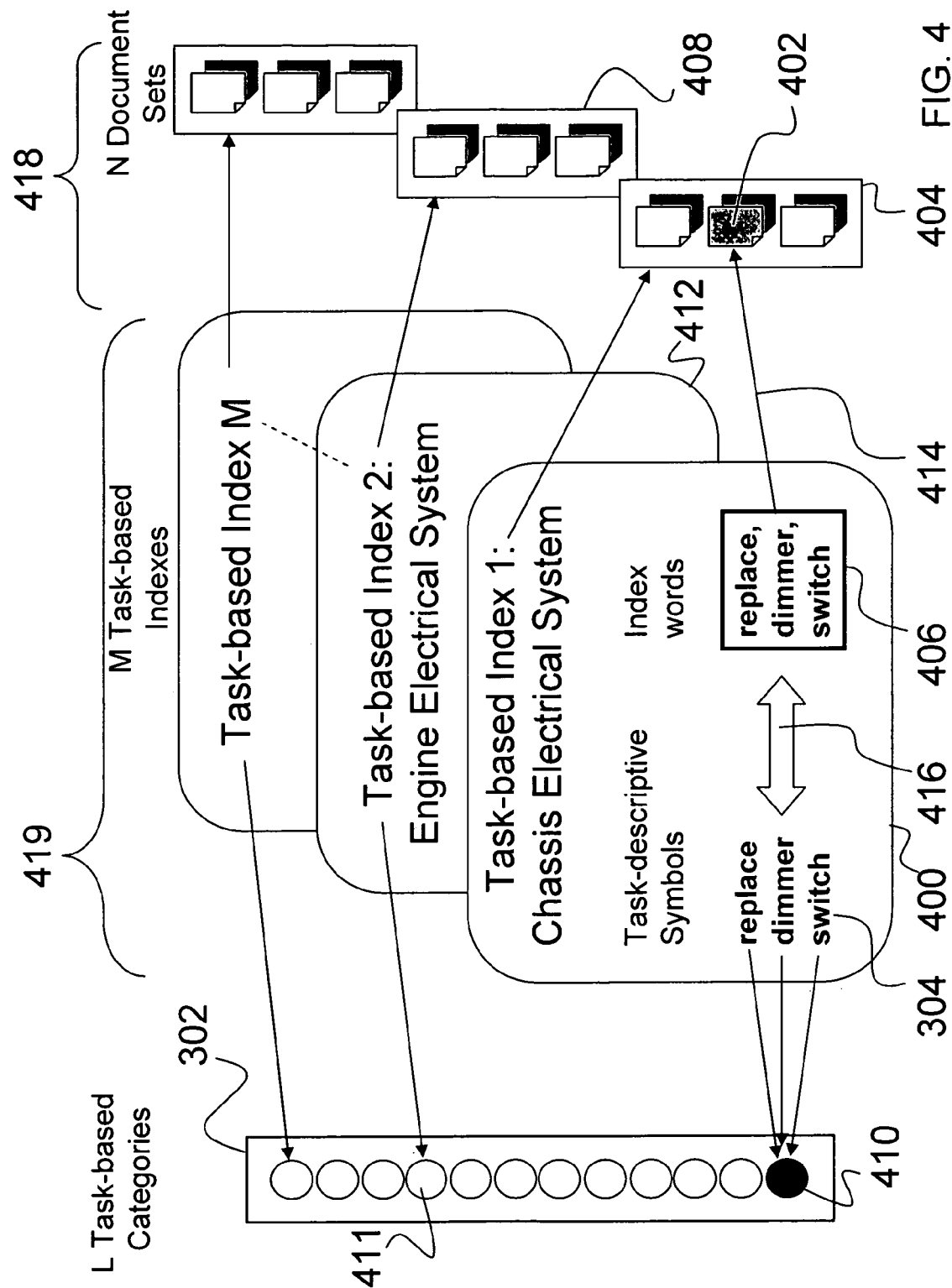

SYSTEM AND METHOD FOR RETRIEVING TASK INFORMATION USING TASK-BASED SEMANTIC INDEXES

GOVERNMENT RIGHTS

The invention described herein was made in the performance of work under government contract number KS7146, entitled, "Operations Multimodal Network Interface (OMNI)," and as such, the government may have certain rights thereto.

FIELD OF INVENTION

The present invention relates to a computer-based search engine, and more particularly, to a system that allows a user to retrieve task information using task-based semantic indexes.

BACKGROUND OF INVENTION

Historically, when searching for information pertaining to a particular topic or task, a user would thumb through a paper index to locate the information, and then physically retrieve the information from another document. With the advent of computers and online search engines, searching for such information is becoming increasingly easy. For example, Google and other search engine inventions focus on the creation of a general index, which allows a user to input keywords to query the general index and hopefully retrieve relevant information. Google is a search engine produce by Google, Inc., located at 1600 Amphitheatre Parkway, Mountain View, Calif. 94043.

Some of these search engines also use a general ontology as an information retrieval method. General ontologies focus on building hierarchies of increasingly superordinate categories (e.g., a dimmer switch is a switch—is a kind of electronic device—is a device—is a thing). These general information retrieval methods focus on faster algorithms using general ontologies.

However, while functional for general searches, such search engines often provide invalid search results due to their generality. For example, should a user use a typical search engine to locate task-based information (e.g., information on how to complete a particular task), the user is likely to retrieve a plethora of irrelevant data, such as websites selling the items for use in the task.

To improve task-based search results, a continuing need exists for a system that focuses on task-based, relatively mutually-exclusive categories for enhancing the relevance of information requested by a trained expert for accomplishing a skilled task.

SUMMARY OF INVENTION

The present invention relates to a method for retrieving task information using a system having task-based indexes. The method comprises multiple acts, including an act of acquiring task-based categories and documents, with each document having subparts and having task information described in the document. The present invention also includes acts of associating at least one task-descriptive symbol with each task-based category; and indexing the documents to create an index having index words and pointers. The index words reflect the task information in the documents and the pointers connect particular index words to particular documents or subparts of documents. The task-descriptive symbols are correlated with the index words to create an alignment of words having similar meaning such that index words are matched with similar task-descriptive symbols. Task-based indexes are formed by grouping the alignment of words with the respective task-based category, whereby a user may use the task-based index by inputting task descriptive symbols, resulting in retrieval of a document having task information pertaining to the task-descriptive symbols.

The present invention further comprises an act of inputting task-descriptive symbols to cause the system to retrieve a document having task information pertaining to the task-descriptive symbols.

In another aspect, the act of inputting task-descriptive symbols is done over a computer network.

Furthermore, the task-based index is formed using ontology language tools by marking up the index with task categories.

In yet another aspect, the acts of acquiring, associating, indexing, correlating, and forming are done over a computer network.

Additionally, the present invention further comprises an act of updating the task-based index as new documents are available.

Finally, the present invention further comprises a system and computer program product. The system is configured to perform the operations of the method described herein. Additionally, the computer program product includes computer-readable instruction means encoded on a computer-readable medium for causing a computer to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3 is a table illustrating exemplary task categories related to vehicle electrical systems and words describing tasks related to electrical switches; and FIG. 4 is an illustration of a task-based information retrieval system according to the present invention, depicting L task-based categories used to partition text documents into N sets.

DETAILED DESCRIPTION

Figure 1:
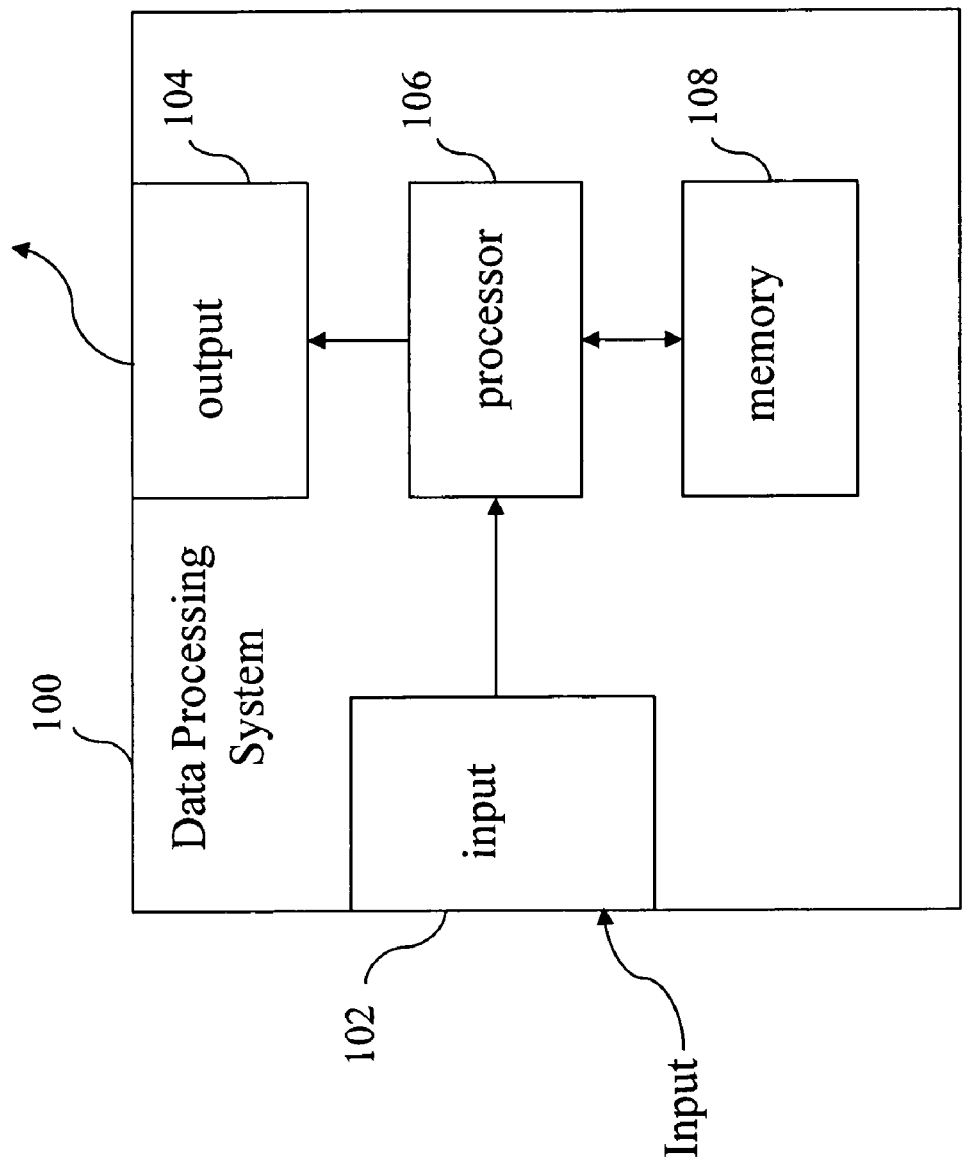
FIG. 1 is a block diagram depicting the components of a task-based information retrieval system according to the present invention.

The present invention relates to a search engine, and more particularly, to a system allowing a user to retrieve task information using task-based semantic indexes. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first, a description of various principal aspects of the present invention is provided. Second, an introduction is provided to provide the reader with a general understanding of the present invention. Third, a description providing the details of various aspects of the present invention is provided to give an understanding of the specific details.

(1) Principal Aspects

The present invention has three "principal" aspects. The first is a task-based information retrieval system. The task-based information retrieval system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a task-based information retrieval system of the present invention is provided in FIG. 1. The task-based information retrieval system 100 comprises an input 102 for receiving a query from a user. Note that the input 102 may include multiple "ports." Typically, input is received from a keyboard or through the Internet. An output 104 is connected with the processor for providing the user with the task-based information. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
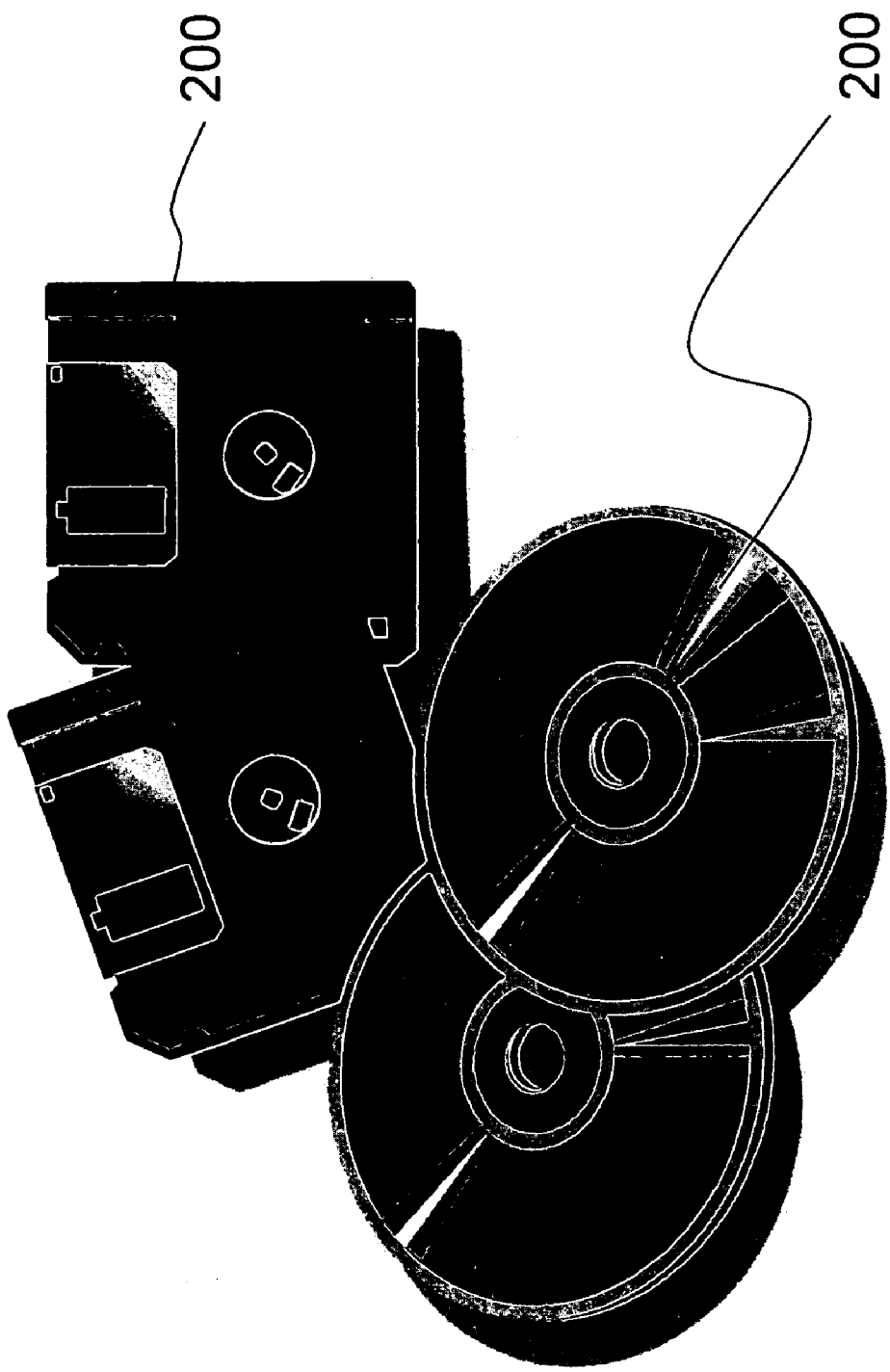
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(2) Introduction

The present invention is a system and method for enhancing the relevance of information requested by a trained expert for accomplishing a task. For example, when an auto mechanic needs instructions for replacing a dimmer switch, the category of this task is specific to the electrical system of a car. The present invention includes a method for constructing a semantic index based on task categories. The method is aimed at enhancing the relevancy of information retrieved as a result of a keyword query. The semantic index is based on categories that are specific to the basic tasks executed by a domain expert. This method exploits the fact that the expert has a specific task in mind, and the keywords they will use to request task instructions will be specific to only that class of tasks, and not others. The invention can be likened to a table of contents consisting of mutually exclusive categories. The exclusion of non-relevant tasks enhances the relevancy of information specific to the task for which the expert is making a query.

The purpose of the present invention is to enhance the relevancy of information that results from keyword queries. An advantage is that the results of a query will consist maximally of the information that is relevant, and minimally of the information that is irrelevant. Current methods (e.g., Google) rely on general ontologies for searching general information, or they employ domain specific ontologies for searching a specific semantic domain (e.g., for searching genome databases). These methods are useful for creating an index for searching general encyclopedic information. Such semantic indexes and ontologies employ cross-cutting (i.e., non-mutually exclusive) categories. For example, encyclopedic searches require cross-cutting categories, because the information about dimmer switches includes how they are made, their material properties, and many other aspects in addition to their electrical properties, and how to install them. To refine the search results, the present invention relies on relatively mutually-exclusive categories based on tasks. For example, the tasks of installing a vehicle instrument panel dimmer switch and diagnosing its malfunction are relevant to the class of tasks about a vehicle electrical system, and not to any other functional system.

The natural organization of functional systems of a vehicle are typically reflected in the table of contents in a maintenance manual. These categories are relatively mutually exclusive. Likewise, the present invention serves as a set of mutually exclusive categories which are used to partition the task information into mutually exclusive sets. Searching for information about one task excludes other tasks, enhancing the relevance of the information in proportion to the number of categories.

Another aspect of the present invention is its exploitation of both the semantics and pragmatics of task information. For any task (e.g., installing a switch), the relevant information is not only the semantic meaning of the objects involved in the task (i.e., what is a switch), but the pragmatics of what is to be done with the objects (i.e., how to install the switch). Even in systems designed for data in a narrow domain of expertise (e.g., a specific genetics data bases), the methods of indexing and categorizing information are not task-specific and mutually exclusive. Thus, the present invention improves upon existing systems by providing a task-based and mutually exclusive index.

(3) Details of Various Aspects

The present invention divides tasks into mutually exclusive categories, which are then exploited for partitioning information into mutually exclusive sets for improving keyword information retrieval. The present invention can be used in a wide array of applications. As non-limiting examples, the present invention can be applied to accessing both aircraft and automotive maintenance manuals using expert categories.

The present invention exploits the fact that expert categories are more specific than those of ordinary usage (i.e., novice categories). The difference between novice categories and expert (task-based) categories is illustrated in the following automotive example. A basic novice category for cars is "Electrical System." Such a category is too general for organizing task information required by an expert. The basic expert task categories typically found in automotive repair manuals are comparatively more specific, covering distinct electrical system categories (e.g., "Engine Electrical System," "Emissions and Engine Control Systems," and "Chassis Electrical System").

A typical Automotive Repair Manual is organized into task categories which are relatively mutually exclusive. FIG. 3 includes a table 300 illustrating an exemplary selection of categories from a typical table of contents, each for a distinct electrical system. For each task-based category 302, the manual describes tasks relevant to that category. The symbols (e.g., words) used to describe tasks are typically in the text and figures of the manual. In a broad sense, the list of words describing tasks (i.e., task-descriptive symbols) 304 related to electrical categories is expectedly large. The task-descriptive symbols 304 are used to associate anything with the task-based categories 302. In many circumstances, it is desirable to use words as the task-descriptive symbols 304. In some cases however, one skilled in the art can appreciate other circumstances where other symbols may be used as the task-descriptive symbols 304. For example, a user may insert an icon or picture representative of an object and corresponding task into the system.

The term "task-descriptive symbol" generally refers to anything that relates code with a meaning. Non-limiting examples of such symbols include words, pictographs, characters, and other icons. Additionally, the meaning as used with respect to the present invention refers to task-based categories. For example, a task-descriptive symbol includes words that relate to a task-based category.

For illustrative purposes, FIG. 3 lists task-descriptive symbols 304 related to electrical switches, associated with each of the three task-based categories 302. As a non-limiting example, suppose a mechanic needs instructions for replacing a dimmer switch. This expert has a specific task in mind, and that task is related to expert knowledge of automotive electrical systems. The category for this example is "Chassis Electrical System," and this is mutually exclusive of all other categories the expert uses to think about tasks. Therefore, the words the expert is likely to use fit with the relevant task category and not with others. For example, the words "chassis," "electrical," and "switch" are only associated with tasks related to a "Chassis Electrical System." The above example is to be contrasted with the query words that a non-expert may use. For example, the words "electrical" and "switch" are associated with information for all three electrical system categories, which include irrelevant tasks such as "check ignition switch," "check clutch switch," "replace clutch switch," and "replace start switch."

Notice in the table that the words "dimmer switch" are correlated only with the category "Chassis Electrical System." In general, the symbols (e.g., words) for describing a task are expected to be highly correlated with one task category. An indexing algorithm applied to the entire automotive manual would not use these categories, and would not be organized into these mutually exclusive tasks.

As shown in FIG. 4, the present invention exploits task-based categories 302 to achieve a set of task-based indexes 400, with each task-based index 400 being relevant to a task-based category 302. As can be appreciated by one skilled in the art, the relationship between indexes 400, categories 302, and document sets does not need to be in a perfect one-to-one ratio. A keyword query about a specific task that uses task-based semantic indexes is expected to access document information relevant to the specific task information. The expected result is a method which enhances the relevance of information retrieval over methods which do not use task-based semantic indexes, with an improvement proportional to the number of task-based indexes.

The task-based categories 302 can be implemented as an ontology comprised of ontological classes or categories, implemented using ontology languages such as Web Ontology Language (OWL). OWL was developed by the World Wide Web Consortium, located at 32 Vassar Street, Room 32-G515, Cambridge, Mass., 02139 U.S.A. OWL markup tools could be used to construct the task-based semantic index by marking up the index with task categories. Machine learning and other category learning systems may be applied for defining the categories. However, it may be desirable to query the experts directly to identify categories which the experts find meaningful for performing tasks in their domain of expertise (e.g., the domain of vehicle maintenance and repair).

As shown in FIG. 4, L task-based categories 302 are used to partition text documents 402 into N document sets 418. Words (i.e., task-descriptive symbols 304) that describe a task within a task-based category 410 correlate with index words 406 from documents 402. The collection of index words 406 grouped within a task category form a task-based index 400. The resulting M task-based indexes 419 map onto N document sets 418. Each document or document part 402 within a document set 404 is more relevant to the index words 406 of that task-based index than those in any other N−1 document sets 408 of the total N document sets 418. For example, query words "replace," "dimmer," and "switch" match the task-descriptive symbols 304 of "Task-based index 1: Chassis Electrical System" 400 which point to the task-based category 410. These words correspond to index words 406 grouped under Task-based index 1 for the "Chassis Electrical System" 400, which point to the most relevant document 402. In this example, the most relevant document 402 is entitled, "Replace Chassis Electrical Switches" 402. Less relevant documents 408 about electrical switches from other task categories 411 will not result from the query, because they are indexed under a different task-based index (e.g., Task-based index 2: Engine Electrical System 412).

In other words, the total corpus of documents is comprised of N document sets 418. Each individual document set 404 and 408 is comprised of documents or sub parts of documents 402. This successively specific organization is listed as follows, from larger to smaller units:

| N Document Sets | 418 |
| Document Set | 404, and 408 |
| Document or subpart of a Document | 402 |

N document sets 418 should correspond with the successively specific organization of indexes as follows:

| M Task-based Indexes | 419 |
| Task-based Index | 400, and 412 |
| Index Words | 406 |

M task-based indexes 419 should correspond with the successively specific organization of categories as follows:

| L Task-based Categories | 302 |
| Task-based Category | 410, and 411 |
| Task-descriptive Symbols | 304 |

As used herein, D refers to the total number of documents in the corpus, L refers to the number of task-based categories, M refers to the number of task-based indexes, and N refers to the number of document sets. L is approximately equal to M, which is approximately equal to N, which is less than or equal to D.

The present invention also includes a method for retrieving the relevant documents 404 using the task-based indexes 400. As can be appreciated by one skilled in the art, acts of the method are described below in a particular order but are not necessarily limited thereto and may be performed in any order that provides the same end result.

Act 1—Acquire Task-Based Categories and Task Description Documents.

The present invention relies on the assumption that there is an available set of categories that experts have in mind when they need information to accomplish their tasks. A variety of practical means can be used to acquire these categories. For example, table of contents entries and section headings of manuals that describe how to accomplish tasks may serve as task categories, with the referenced pages in the manual being the task description documents. Additionally, there are cases in which exhaustive task categories are explicitly described. For example, the U.S. military has put considerable effort into defining exhaustive task lists, published in The Army Universal Task List (FM 7-15) 31 Aug. 2003, Soldier's Manual of Common Tasks: Skill Levels 1 (STP 21-1-SMCT) 31 Aug. 2003, and the Soldier's Manual of Common Tasks: Skill Levels 2-4, 31 Aug. 2003. If a set of categories is not readily available it is possible to derive them empirically or by introspection, as evidenced by the above examples. Once compiled, the task-based categories and related documents are incorporated into a system to be used as described further below.

Act 2—Associate Task-Descriptive Symbols with Each Task-Based Category.

The present invention includes an algorithm that is applied to the documents 404 to collect symbols (e.g., words) that are used to describe tasks for each task-based category 302. In another aspect, the symbols that are used to describe tasks for each task-based category 302 are manually collected. By way of illustration, FIG. 3 depicts a task-based category 410 and the associated task-descriptive symbols 304. For example, the words "replace," "dimmer," and "switch" culled from a repair manual text are associated with the category "Chassis Electrical System," a heading in the manual's table of contents.

Act 3—Index the Documents.

The documents 404 (or task manual sections) that include the requisite information (as correlated with the task-based categories) are indexed using indexing algorithms. This results in a single index 400 comprised of index words 406 and pointers 414 to documents 402 or subparts of documents. The subparts of a document may be a word, paragraph, or other material contained within a particular document.

Act 4—Correlate Task Descriptive Symbols with Index Words.

The task-descriptive symbols 304 (resulting from Act 2) and index words 406 (resulting from Act 3) are correlated 416 with each other. The result is an alignment of words having similar meaning such that index items consisting of groups of words are matched with similar task-descriptive symbols 304 (e.g., "replace," "dimmer," and "switch".). This may be accomplished by simple lexical matching or more sophisticated natural language processing which would account for a variety of word and sentence structures, including morphosyntactic and semantic relations. This would allow the word "switch" to align with related word forms (e.g., "switches" and "switched") and related word meanings (e.g., "toggle" and "potentiometer").

Act 5—Form Task-Based Indexes.

Task-descriptive symbols 304 correlated with index words 406 are the result from Act 4. For example, one set of correlated 416 words is illustrated in FIG. 4. For each task-based category 410, groups of correlated index words are formed. Grouping the index words 406 into task-based categories 302 results in task-based indexes 400. Each task-based category 410 should result in the formation of one task-based index 400. Each task-based index 400 defines a partition of the whole document set 418. The collection of M task-based indexes 419 partitions D whole documents into N document sets 418.

Acts 1 through 5 provide a task-based semantic index comprised of relations among L task-based categories 302, M task-based indexes 419, and N document sets 418.

Act 6—Using the Task-Based Semantic Index.

The task-based semantic index resides in a computer system which typically accepts query words as input and produces a list of documents or subparts of documents as output. FIG. 4 illustrates an example in which the query words "replace," "dimmer," and "switch" are input by a user who wants instructions for the task of replacing the dimmer switch of a vehicle chassis electrical system. As shown, the query words match the category Chassis Electrical System 410. This is the case in which the query does not explicitly name the category. However, in another aspect, a user may explicitly select a category by using words or other means of input.

The identified task-based category 410 has its own task-based index 400 (e.g., task-based index 1: Chassis Electrical System). The query words match index words 406 grouped under the task-based index 400, which point to the most relevant document 402. In the non-limiting example shown in FIG. 4, the pointer 414 points to the document "Replace Chassis Electrical Switches" 402. Irrelevant documents about electrical switches from other task categories (e.g., Engine Electrical System) will not be returned because they are indexed under a different task-based index 412. In general, the document sets 404 indexed by any one task-based index 400 are more relevant to the index words 406 in the corresponding task-based index 400 than those in any other N−1 document sets 408.

As can be appreciated by one skilled in the art, the method described herein can be performed using a variety of techniques. For example, Acts 1 through 5 may be performed using a computer system offline, while Act 6 is performed over a computer network (e.g., internal network, or online over the Internet). Another aspect provides for all of the relevant acts being performed online in a real-time process. Such an aspect would allow the task-based index to be continually updated or modified to reflect current documents and task-based categories.

Act 6 may also be achieved by hand crafting the correspondence between elements 400, 404, and 410, then applying an index algorithm to the documents within the set in order to determine the index words 406 and pointers 414, and their correspondence 416 to task-descriptive symbols 304. For example, FIG. 4 shows that Index 2: Engine Electrical System 412 corresponds to the entire set of documents 408, and does not show pointers to individual documents in that set. Beginning with the hand crafted correspondence between one task-based category 411, Index 2: Engine Electrical system 412, and the document set 408, an indexing algorithm could be applied to determine the index words, pointers, and their correspondence to task-descriptive symbols relevant to the category Engine Electrical System 411.

Additionally, it should be noted that the present invention can be applied to any technological industry or field having expert task-based categories. The description above uses the automotive industry for exemplary purposes only and is not intended to be limited thereto.

Finally, although described in parts as a method, the present invention also includes a computer program product and system being configured to perform the operations of the method described herein.

What is claimed is:

1. A computer-implemented method for retrieving task information using a system having task-based indexes, comprising an act of causing a processor to perform acts of:
    acquiring a plurality of mutually exclusive task-based categories, where L is the number of task based categories;
    receiving a plurality of text documents, where D is the number of text based documents;
    partitioning the text documents into a plurality of document sets, where N is the number of document sets, such that each task-based category is associated with a document set, where each document set is comprised of at least one document having subparts and having task information described in the document;
    associating at least one task-descriptive symbol with each task-based category;
    indexing the documents in each document set to create an index having index words and pointers, where the index words reflect the task information in the documents or subparts of documents;
    correlating the task-descriptive symbols with the index words to create an alignment of words having similar meaning such that index words are matched with similar task-descriptive symbols; and
    forming a plurality of task-based indexes by grouping the alignment of words with the respective task-based category, where M is the number of task based indexes, and where L is equal to N, which is equal to M, which is less than or equal to D, such that retrieval of a document having task based information pertaining to the task descriptive symbols is a function of the task based index.

2. A method for retrieving task information as set forth in claim 1, further comprising an act of inputting task-descriptive symbols to cause the system to retrieve a document having task information pertaining to the task-descriptive symbols.

3. A method for retrieving task information as set forth in claim 2, wherein the act of inputting task-descriptive symbols is done over a computer network.

4. A method for retrieving task information as set forth in claim 3, wherein the task-based index is formed using ontology language tools by marking up the index with task categories.

5. A method for retrieving task information as set forth in claim 4, wherein the acts of acquiring associating, indexing, correlating, and forming are done over a computer network.

6. A method for retrieving task information as set forth in claim 5, further comprising an act of updating the task-based index as new documents are available.

7. A method for retrieving task information as set forth in claim 1, wherein the act of inputting task-descriptive symbols is done over a computer network.

8. A method for retrieving task information as set forth in claim 1, wherein the task-based index is formed using ontology language tools by marking up the index with task categories.

9. A method for retrieving task information as set forth in claim 1, wherein the acts of acquiring associating, indexing, correlating, and forming are done over a computer network.

10. A method for retrieving task information as set forth in claim 1, further comprising an act of updating the task-based index as new documents are available.

11. A computer program product for retrieving task information using task-based indexes, the computer program product comprising computer-readable instruction means encoded on a non-transitory Computer-readable medium for causing a computer to:
    acquire a plurality of mutually exclusive task-based categories, where L is the number of task based categories;
    receive a plurality of text documents, where D is the number of text based documents;
    partition the text documents into a plurality of document sets, where N is the number of document sets, such that each task-based category is associated with a document set, where each document set is comprised of at least one document having subparts and having task information described in the document;
    associate at least one task-descriptive symbol with each task-based category, index the documents in each document set to create an index having index words and pointers, where the index words reflect the task information in the documents or subparts of documents; correlate the task-descriptive symbols with the index words to create an alignment of words having similar meaning such that index words are matched with similar task-descriptive symbols; and
    form a plurality of task-based indexes by grouping the alignment of words with the respective task-based category, where M is the number of task-based indexes, and where L is equal to N, which is equal to M, which is less than or equal to D, such that retrieval of a document having task based information pertaining to the task descriptive symbols is a function of the task based index.

12. A computer program product for retrieving task information as set forth in claim 11, further comprising instruction means for causing a computer to receive task-descriptive symbols to cause the system to retrieve a document having task information pertaining to the task-descriptive symbols.

13. A computer program product for retrieving task information as set forth in claim 12, wherein the computer program product is further configured to receive task-descriptive symbols over a computer network.

14. A computer program product for retrieving task information as set forth in claim 13, wherein the task-based index is formed using ontology language tools by marking up the index with task categories.

15. A computer program product for retrieving task information as set forth in claim 14, wherein the computer program product is further configured to associate, index, correlate, and form over a computer network.

16. A computer program product for retrieving task information as set forth in claim 15, wherein the computer program product is further configured to update the task-based index as new documents are available.

17. A computer program product for retrieving task information as set forth in claim 11, wherein the computer program product is further configured to receive task-descriptive symbols over a computer network.

18. A computer program product for retrieving task information as set forth in claim 11, wherein the task-based index is formed using ontology language tools by marking up the index with task categories.

19. A computer program product for retrieving task information as set forth in claim 11, wherein the computer program product is further configured to associate, index, correlate, and form over a computer network.

20. A computer program product for retrieving task information as set forth in claim 11, wherein the computer program product is further configured to update the task-based index as new documents are available.

21. A system for retrieving task information using task-based indexes, the system comprising: a memory and a processor including computer-readable instructions for causing the system to:
    acquire a plurality of mutually exclusive task-based categories, where L is the number of task based categories;
    receive a plurality of text documents, where D is the number of text based documents;
    partition the text documents into a plurality of document sets, where N is the number of document sets, such that each task-based Category is associated with a document set, where each document set is comprised of at least one document having subparts and having task information described in the document;
    associate at least one task-descriptive symbol with each task-based category, index the documents in each document set to create an index having index words and pointers, where the index words reflect the task information in the documents or subparts of documents;
    correlate the task-descriptive symbols with the index words to create an alignment of words having similar meaning such that index words are matched with similar task-descriptive symbols; and
    form a plurality of task-based indexes by grouping the alignment of words with the respective task-based category, where M is the number of task-based indexes, and where L is equal to N, which is equal to M, which is less than or equal to D, such that retrieval of a document having task based information pertaining to the task descriptive symbols is a function of the task based index.

22. A system for retrieving task information as set forth in claim 21, further being configured to cause a computer to receive task-descriptive symbols to cause the system to retrieve a document having task information pertaining to the task-descriptive symbols.

23. A system for retrieving task information as set forth in claim 22, wherein the system is further configured to receive task-descriptive symbols over a computer network.

24. A system for retrieving task information as set forth in claim 23, wherein the task-based index is formed using ontology language tools by marking up the index with task categories.

25. A system for retrieving task information as set forth in claim 24, wherein the system is further configured to associate, index, correlate, and form over a computer network.

26. A system for retrieving task information as set forth in claim 25, wherein the system is further configured to update the task-based index as new documents are available.

27. A system for retrieving task information as set forth in claim 21, wherein the system is further configured to receive task-descriptive symbols over a computer network.

28. A system for retrieving task information as set forth in claim 21, wherein the task-based index is formed using ontology language tools by marking up the index with task categories.

29. A system for retrieving task information as set forth in claim 21, wherein the system is further configured to associate, index, correlate, and form over a computer network.

30. A system for retrieving task information as set forth in claim 21, wherein the system is further configured to update the task-based index as new documents are available.

* * * * *